US007055052B2

(12) United States Patent
Chalasani et al.

(10) Patent No.: US 7,055,052 B2
(45) Date of Patent: May 30, 2006

(54) SELF HEALING GRID ARCHITECTURE FOR DECENTRALIZED COMPONENT-BASED SYSTEMS

(75) Inventors: Nanchariah Raghu Chalasani, Fairfax, VA (US); Quddus Chong, Kansas City, MO (US); Dolapo Martin Falola, RoundRock, TX (US); Ajamu Akinwunmi Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 10/301,192

(22) Filed: Nov. 21, 2002

(65) Prior Publication Data

US 2004/0103338 A1    May 27, 2004

(51) Int. Cl.
*G06F 11/00* (2006.01)
(52) U.S. Cl. .............................. 714/4; 714/15; 709/221
(58) Field of Classification Search ................ 714/4, 714/15; 715/734; 709/221
See application file for complete search history.

(56) References Cited

U.S. PATENT DOCUMENTS

| 5,173,689 A | | 12/1992 | Kusano ..................... 340/827 |
| 5,951,694 A | * | 9/1999 | Choquier et al. ............ 714/15 |
| 5,987,621 A | | 11/1999 | Duso et al. .................... 714/4 |
| 5,996,001 A | * | 11/1999 | Quarles et al. ............ 709/203 |
| 6,330,689 B1 | | 12/2001 | Jin et al. ..................... 714/15 |
| 6,360,331 B1 | * | 3/2002 | Vert et al. ..................... 714/4 |
| 6,779,016 B1 | * | 8/2004 | Aziz et al. .................. 709/201 |
| 6,856,942 B1 | * | 2/2005 | Garnett et al. ............. 702/183 |
| 6,898,727 B1 | * | 5/2005 | Wang et al. ................... 714/4 |
| 2002/0007468 A1 | * | 1/2002 | Kampe et al. ................. 714/4 |
| 2002/0056053 A1 | * | 5/2002 | Vine et al. ..................... 714/4 |
| 2003/0074602 A1 | * | 4/2003 | Lomet et al. ................. 714/15 |
| 2004/0003077 A1 | * | 1/2004 | Bantz et al. ................ 709/224 |
| 2004/0103195 A1 | * | 5/2004 | Chalasani et al. .......... 709/226 |
| 2004/0103339 A1 | * | 5/2004 | Chalasani et al. ............. 714/4 |

(Continued)

FOREIGN PATENT DOCUMENTS

WO    WO 02/01347    1/2002

OTHER PUBLICATIONS

T. Wu, *A Passive Protected Self-Healing Mesh Network Architecture and Applications*, IEEE/ACM Transactions on Networking, vol. 2, No. 1, pp. 40-52, (Feb. 1994).

(Continued)

*Primary Examiner*—Robert Beausoliel
*Assistant Examiner*—Christopher McCarthy
(74) *Attorney, Agent, or Firm*—Jeanine Ray-Yarletts; Steven M. Greenberg; Christopher & Weisberg, P.A.

(57) ABSTRACT

A self-healing and self-optimizing grid architecture can be provided in accordance with the present invention. Specifically, the architecture can include a mechanism for detecting component failures, and even degraded component performance, within peer components in a hosting service. Once a failure has been detected, the detecting peer to undertake remedial action to recreate and redeploy the component in the hosting system. In particular, the detecting component can acquire the behavior of the failed component and the detecting component can instantiate an instance of the behavior in another server in the grid. Thus, the mechanism described herein can be analogized to biotechnical DNA as every component in the hosting service can maintain an awareness of the state of the entire system and can recreate the entire system through knowledge provided by grid services DNA.

5 Claims, 4 Drawing Sheets

U.S. PATENT DOCUMENTS

2004/0230897 A1* 11/2004 Latzel ........................ 715/513
2005/0081083 A1* 4/2005 Polan ............................ 714/4

OTHER PUBLICATIONS

R. J. Abbott, *Resourceful Systems and Software Fault Tolerance*, ACM O-89791-271-3/88/0006, pp. 992-1000, (1988).

S. Han, et al., *Fast Restoration of Real-Time Communication Service from Component Failures in Multi-hop Networks*, Proc. of ACM SIGCOMM Symposium, vol. 27, No. 4, pp. 77-88, (Oct. 1997).

Stelling, et al., *A fault detection service for wide area distributed computations*, Cluster Computing 2, pp. 117-128, (1999).

Ravindran, et al., *Resource Management Middleware for Dynamic, Dependable Real-Time Systems*, Real-Time Systems, vol. 20, pp. 183-196, (2000).

K. Janssen, et al., *Component Failure Detection Via State Estimation*, A Bridge Between Control Science and Technology, IFAC Proc. Series, vol. 4, pp. 2213-2218, (1985).

Z. Medicoff, *Businesses gird for grid computing breakthroughs*, Globeandmail.com, Sep. 2002).

* cited by examiner

SELF HEALING GRID ARCHITECTURE FOR DECENTRALIZED COMPONENT-BASED SYSTEMS

BACKGROUND OF THE INVENTION

1. Statement of the Technical Field

The present invention relates to the autonomic computing and more particularly to an autonomic Web services hosting infrastructure.

2. Description of the Related Art

Web services have become a focal point of technical innovation and new business opportunity. In particular, Web services offer a solution to the interoperability problem for heterogeneous computing systems. Consequently, Web services technology promises to provide computing resources to end users distributed about the global computer communications network based upon a pay-per-use model. Still, the rate of adoption for Web services technology remains inhibited by the complexity involved in deploying new Web services. In particular, providers of Web services hold strong concerns in regard to the availability of deployed Web services.

Specifically, from the perspective of the Web services provider, the unexpected unavailability of a deployed Web service can translate in lost business revenues, though the unexpected unavailability can arise from an excess demand for the deployed Web service which exceeds the capacity of the Web services hosting environment. As a result, typical hosting environments are "over-engineered" to ensure redundancy, quality of service and high availability. Consequently, system engineers find themselves trying to master the delicate and often expensive balance between over-capacity and under-utilization.

To balance both the matter of over-capacity and under-utilization in a Web services hosting environment, typically a communication mechanism is disposed between the gateway nodes the provide the Web services, the Web service deployment agency, and the agency tasked with deciding when to provision a Web service, or to offload the provisioning of the Web service to another host. The communication mechanism can provide critical coordination between the nodes and the agencies so that the tasked agency can effectively balance capacity and utilization of Web services.

Aside from high-availability considerations relating to the capacity of the Web services hosting environment, availability issues also can arise from the failure or mal-operation of a deployed Web services. More particularly, distributed systems as a whole often suffer based upon the characteristics of an individual component. For instance, where one Web service experiences a heavy load or fails altogether, the quality of service (QoS) experienced about the entire distributed system can degrade in quality. Therefore, the more distributed a system, the more important can be for the distributed system to be "autonomic".

In the famed manifesto, *Autonomic Computing: IBM's Perspective on the State of Information Technology*, Paul Horn, Senior Vice President of IBM Research, observed, "It's not about keeping pace with Moore's Law, but rather dealing with the consequences of its decades-long reign." Given this observation, Horn suggested a computing parallel to the autonomic nervous system of the biological sciences. Namely, whereas the autonomic nervous system of a human being monitors, regulates, repairs and responds to changing conditions without any conscious effort on the part of the human being, in an autonomic computing system, the system must self-regulate, self-repair and respond to changing conditions, without requiring any conscious effort on the part of the computing system operator.

Thus, while the autonomic nervous system can relieve the human being from the burden of coping with complexity, so too can an autonomic computing system. Rather, the computing system itself can bear the responsibility of coping with its own complexity. The crux of the IBM manifesto relates to eight principal characteristics of an autonomic computing system:

I. The system must "know itself" and include those system components which also possess a system identify.

II. The system must be able to configure and reconfigure itself under varying and unpredictable conditions.

III. The system must never settle for the status quo and the system must always look for ways to optimize its workings.

IV. The system must be self-healing and capable of recovering from routine and extraordinary events that might cause some of its parts to malfunction.

V. The system must be an expert in self-protection.

VI. The system must know its environment and the context surrounding its activity, and act accordingly.

VII. The system must adhere to open standards.

VIII. The system must anticipate the optimized resources needed while keeping its complexity hidden from the user.

Conventional business models increasingly rely upon the use of Web services to maintain cross-platform compatibility, value-chain relationships, customer relationships, and partner relationships. With the rapid undertaking and deployment of Web services, however, focus has shifted to the interoperability of various Web services across the value chain. In furtherance of this effort, the Open Grid Services Architecture (OGSA) has been leveraged to address the problem of support and software maintenance among Web services components distributed about the Web services hosting environment.

Notably, the physiology of a grid mechanism through OGSA can provide protocols both in discovery and also in binding of Web services, hereinafter referred to as "grid services", across distributed systems in a manner which would otherwise not be possible through the exclusive use of registries, directories and discovery protocols. As described both in Ian Foster, Carl Kesselman, and Steven Tuecke, *The Anatomy of the Grid*, Intl J. Supercomputer Applications (2001), and also in Ian Foster, Carl Kesselman, Jeffrey M. Nick and Steven Tuecke, *The Physiology of the Grid*, Globus.org (Jun. 22, 2002), a grid mechanism can provide distributed computing infrastructure through which grid services instances can be created, named and discovered by requesting clients.

Grid services extend mere Web services by providing enhanced resource sharing and scheduling support, support for long-lived state commonly required by sophisticated distributed applications, as well as support for inter-enterprise collaborations. Moreover, while Web services alone address discovery and invocation of persistent services, grid services support transient service instances which can be created and destroyed dynamically. Notable benefits of using grid services can include a reduced cost of ownership of information technology due to the more efficient utilization of computing resources, and an improvement in the ease of integrating various computing components. Thus, the grid mechanism, and in particular, a grid mechanism which conforms to the OGSA, can implement a service-oriented architecture through which a basis for distributed system integration can be provided—even across organizational domains.

While grid services can be configured to provide an enhanced utilization of computing resources, grid services heretofore have not been able to provide a differential utilization of computing resources. Varying levels of computing services can be provided based upon what has been referred to as a "policy based service differentiation model". In a policy based service differentiation model, the computing devices can offer many levels of service where different requests for different content or services which originate from different requestors receive different levels of treatment depending upon administratively defined policies. In that regard, a service level agreement (SLA) can specify a guaranteed level of responsiveness associated with particular content or services irrespective of any particular requestor. By comparison, quality of service (QoS) terms specify a guaranteed level of responsiveness minimally owed to particular requesters.

The policy based service differentiation model is the logical result of several factors. Firstly, the number and variety of computing applications which generate requests across networks both private and public has increased dramatically in the last decade. Each of these applications, however, has different service requirements. Secondly, technologies and protocols that enable the provision of different services having different security and service levels have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

The Web service level agreement (WSLA) is a proposed specification which defines a markup language for representing assertions by a service provider to guarantee a defined level of service. By comparison, WS-Policy is a proposed specification which provides a general purpose framework for describing and communicating policies and business rules associated with a Web service. As cross-enterprise technologies such as the Web service and the grid services mechanism adopt autonomic principals, the need exists to leverage business rules to govern the self-adapting nature of the Web services hosting environment. In particular, it would be preferable for a Web services hosting environment to be able to detect, in advance, the imminent inability of the Web services hosting environment to meet the contractual requirements of an SLA. In response, it would be preferable to the Web services hosting environment to autonomically heal itself and to undertake remedial measures so as to meet the contractual terms of the SLA.

SUMMARY OF THE INVENTION

A self-healing and self-optimizing grid architecture can be provided in accordance with the present invention. Specifically, the architecture can include a mechanism for detecting component failures, and even degraded component performance, within peer components in a hosting service. Once a failure has been detected, the detecting peer to undertake remedial action to recreate and redeploy the component in the hosting system. In particular, the detecting component can acquire the behavior of the failed component and the detecting component can instantiate an instance of the behavior in another server in the grid. Thus, the mechanism described herein can be analogized to biotechnical DNA as every component in the hosting service can maintain an awareness of the state of the entire system and can recreate the entire system through knowledge provided by grid services DNA.

In one aspect of the invention, an autonomic Web services grid can be configured with the grid services DNA of the present invention. In particular, the autonomic Web services grid can include a grid services DNA repository in which one or more grid services DNA documents can be stored. Notably, the grid services DNA documents can provide information required to recreate corresponding hosting services. The autonomic Web services grid also can include a grid services DNA interpreter configured to couple individual ones of the grid services DNA documents to components of the corresponding hosting services in order to perform self-healing of the corresponding hosting services in the Web services grid.

In an autonomic Web services grid, a grid services DNA can include a listing of components and corresponding behaviors disposed in the autonomic Web services grid. Also, the grid services DNA can include a location specification specifying the location in the autonomic Web services grid of each implementation of the corresponding behaviors. State data for at least one of the components further can be included in the grid services DNA. Finally, the grid services DNA can include a version indication for the grid services DNA.

Importantly, in one aspect of the invention, the location specification further can include a specification of locations in the autonomic Web services grid of particular instances of the behaviors. Additionally, the location specification can include a specification of locations of physical resources in the autonomic Web services grid in which instances of the behaviors can be created. Finally, the state data can include at least one of capacity data, performance data, capabilities data, and configuration data relating to the at least one of the components.

A method of self-healing in a Web services grid having multiple hosting service components can include several steps. First, a failure of a peer hosting service component can be detected in at least one of the hosting service components. Also, a grid services DNA can be loaded. Notably, the grid services DNA can specify sufficient resource data necessary to redeploy any one failed hosting service component in the Web services grid. Finally, the failed peer hosting service component can be redeployed based upon an associated behavior specified in the grid services DNA.

In one non-exclusive aspect of the present invention, the detecting step can include forwarding a status message to at least one peer hosting service component in the Web services grid. If no response is received to the status message, or a response is received only after a delay which exceeds a pre-determined threshold, it can be determined that the peer hosting service component has failed. The redeploying step, by comparison, can include alerting other peer hosting service components in the Web services grid of the detected failure; including with the alert a timestamp; receiving acknowledgments of the alert from the other peer hosting service components; and, computing a lowest timestamp among any timestamps included in the acknowledgments. If the time stamp included with the alert is computed to be the lowest timestamp, the redeploying step can be performed. Otherwise, the redeploying step can be suppressed.

To that end, the redeploying step can include deploying the failed peer component in a new physical location other than the physical location in which the failed peer component failed. At that time, the deployed failed peer component can retrieve its prior state from the grid services DNA. Subsequently, the grid services DNA can be updated to specify the new physical location. Finally, the updated grid services DNA can be forwarded to others of the hosting service components.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an autonomic Web services hosting infrastructure. In accordance with the present invention, grid services DNA can be associated with hosting service components in the grid. The grid services DNA can describe enough fundamental elements of associated hosting service components so that other components in the grid can provision a duplicate replacement component by reference to the grid services DNA alone. In consequence, the use of decentralized grid services DNA in the grid architecture of the present invention can provide for an enhanced autonomic behavior, in particular, self-healing.

Notably, it has been observed that living organisms include a mechanism in which information can be stored from which cellular components can be replicated without limitation. In that regard, cellular DNA can store a genetic blueprint of the living organism able to guide the construction of the cellular components of the living organism. Analogously, in accordance with the present invention, a technical blueprint referred to hereinafter as a grid services distributed network agreement (grid services DNA) can provide a specification of the state and composition of the grid architecture. More particularly, the grid services DNA can describe the technical attributes, state and other characteristics of the grid architecture.

Figure 1:
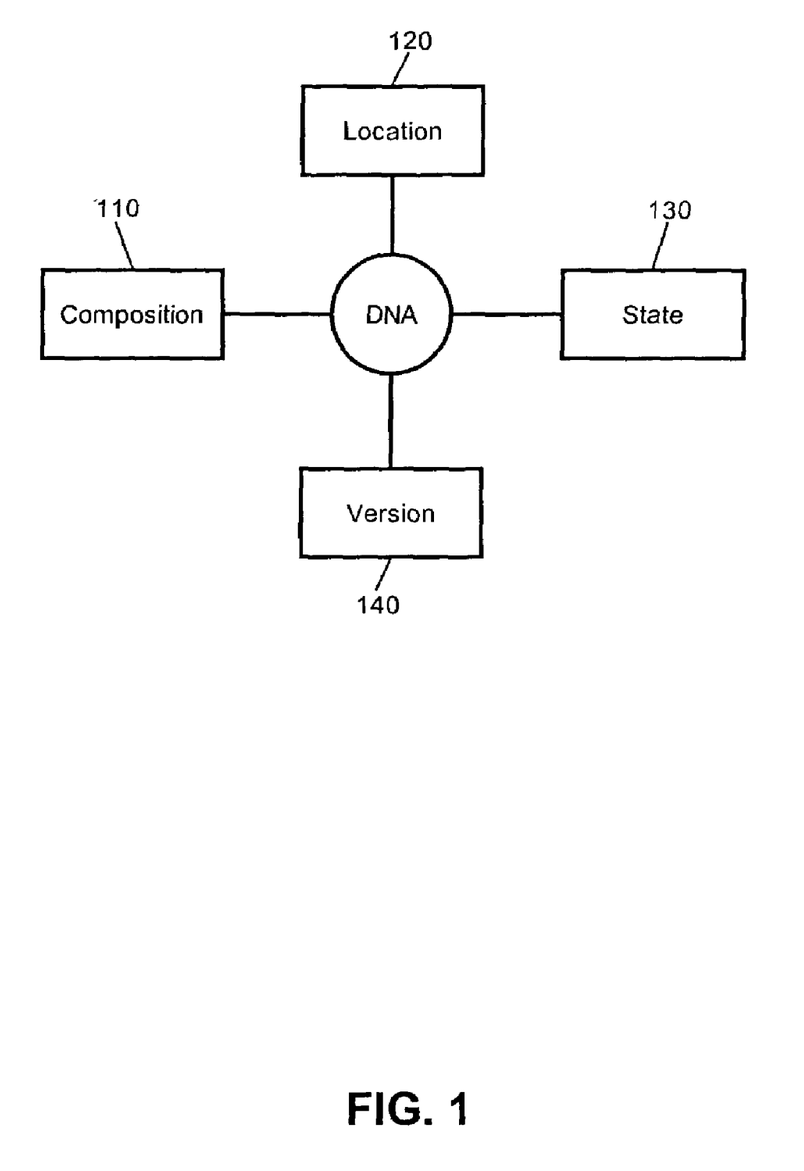
FIG. 1 is a block illustration of the grid services DNA of the present invention.

FIG. 1 is a block illustration of the grid services DNA of the present invention. As shown in FIG. 1, the grid services DNA can include a specification of composition 110, location 120, state 130 and version 140. The composition 110 can specify the components forming the Web services system. Specifically, the components can be referenced as "behaviors" whose composition forms the overall functionality of the Web services system. The location 120, in contrast, can specify the location of the implementation of each behavior in the system, the location of instances of the behaviors, and the location of physical resources in which the instances can be created.

The state 130 can provide a location from which individual component state information and meta-data can be retrieved. More particularly, the state can represent information in the component that must be persisted across deployment instances. Examples can include the capacity and performance of each component, the configuration of the component and the capabilities of the component. Finally, the version 140 can specify the version of the grid services DNA.

Figure 2:
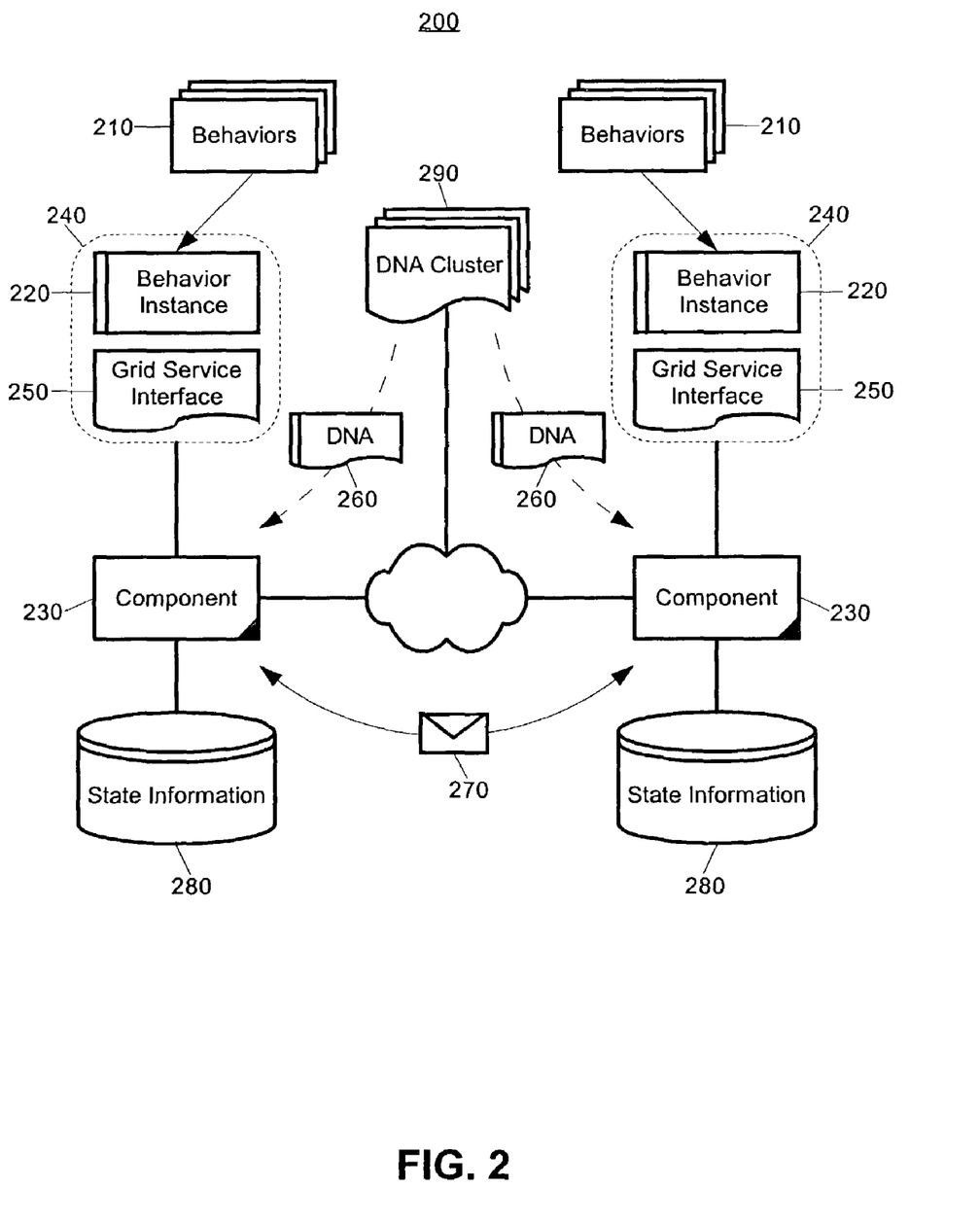
FIG. 2 is a schematic illustration of a grid architecture which has been configured to support grid services DNA.

FIG. 2 is a schematic illustration of a grid architecture which has been configured to support grid services DNA. In the grid architecture 200, a distinction can be made between individual behaviors 210 (implementations) and instances 220 of the behavior implementations. Components 230 in the grid architecture 200 which have been configured to interoperate with grid services DNA are able to dynamically access the functionality and data of a behavior instance 220, or to create an instance 220 of the behavior from a behavior 210. In either case, the behaviors 210 in the grid can be exposed as individual grid services 240 by creating an interface 250 to the individual behaviors 210 and by publishing the interfaces as 250 WSDL documents. Inasmuch as the location of each behavior 210 can be stored in grid services DNA 260, any component 230 in the grid 200 can access the behavior 210 of any peer component 230 by referencing the grid services DNA 260 of the behavior 210.

Components 230 in the self-healing architecture 200 of the grid can detect a malfunction in any portion of the architecture. Specifically, components 230 can exchange with one another periodic status messages 270 with other components 230 in order to make each component 230 aware of the status of their peers. Ordinarily, the length of time taken to receive a response to a status invocation, or a lack of a response altogether, can serve as indication that a component 230 may have failed. A delayed or absent response can indicate that a failing component ought to be redeployed elsewhere in the grid. Alternatively, the delayed or absent response can be indicative of the need to optimize or repair the system as a whole.

Each component 230 in the system can persist serialized state information 280 to a location specified by the grid services DNA 260. For example, the OGSA ServiceData schema can be used as a formal specification of the format of the state information. In the event of detecting a component failure, a recreated instance of the component 230 can be restored to a pre-failure state. Coupled with the ability of the component 230 to acquire a particular behavior 210 of another component 230, state restoration as described herein allows for the replacement of a failed behavior instance 220 that can continue to serve the functionality of the component 230, thus providing reliability to users of the network. Importantly, it is not required that the state information be stored to a single location. Rather, fail-safe persistent storage mechanisms such as that provided by conventional database technology or enterprise Java beans can be leveraged for this purpose.

Importantly, it will be apparent to one skilled in the art that by deploying grid services DNA 260 for components 230 in the grid architecture 200, it can become necessary to store the grid services DNA 260 in a convenient, accessible manner so that all components 230 in the grid 200 can rapidly and reliably access information contained in the grid services DNA 260. At one extreme (not illustrated), an entire set of all grid services DNA can be copied to each host in the grid, albeit such a solution could be unwieldy quickly. Additionally, where multiple sets of grid services DNA are distributed about the grid, data synchronization problems can arise, such as the case where different sets of grid services DNA directed to identical components in the grid provide disparate information.

Consequently, it can be helpful in the grid architecture of the present invention to store the grid services DNA 260 as shown in FIG. 2 in a cluster of servers 290 upon which the components 230 of the grid 200 can rely when seeking any particular grid services DNA 260 in accordance with the inventive arrangements. When a component 230 in the grid 200 detects a failure requiring the component 230 to access the grid services DNA 260 associated to undertake state restoration, the responding component 230 need only request the grid services DNA 260 from the server cluster 290. Thus, by deploying a cluster of servers 290 which is smaller than the total number of servers in the, the problem of synchronizing sets of grid services DNA can be remediated somewhat.

Still, in the case of a cluster of servers managing mirror image sets of grid services DNA can remain problematic where the configuration of the components change more frequently than not. In that case, the set of grid services DNA can be stored in a central repository (not illustrated) such as a network-accessible database. Conventional database technology already accounts for fault tolerance and fail-over scenarios. Also, the use of a central repository handily addresses the issue of contention between competing sets of grid services DNA.

The grid services DNA 260 of the present invention can include necessary and sufficient information needed to recreate the entire system of components 230 in the grid 200 in case of a failure. Likewise, the grid services DNA 260 associated with any one failed component or components in the grid can assist a responsible component which detects the failure in initiating the self-healing architecture. In this regard, the failed component or components, in the aggregate, can be viewed as a resource or managing entity, often referred to as a "hosting service".

A hosting service is the managing entity for a collection of Web services. The hosting service is the logical model of grid service components in a Web service hosting environment that can monitor Web service sessions, make provisioning decisions, communicate with peer hosting services, and deploy Web services on request. In a preferred aspect of the present invention, each hosting service component in the hosting service can be a grid service described using WSDL and invoked, for example, over SOAP. Moreover, the hosting service components can be physically running under the same server, or the hosting service components can be distributed over a network. In either case, the hosting services form the nodes of the autonomic grid of the present invention.

Figure 3:
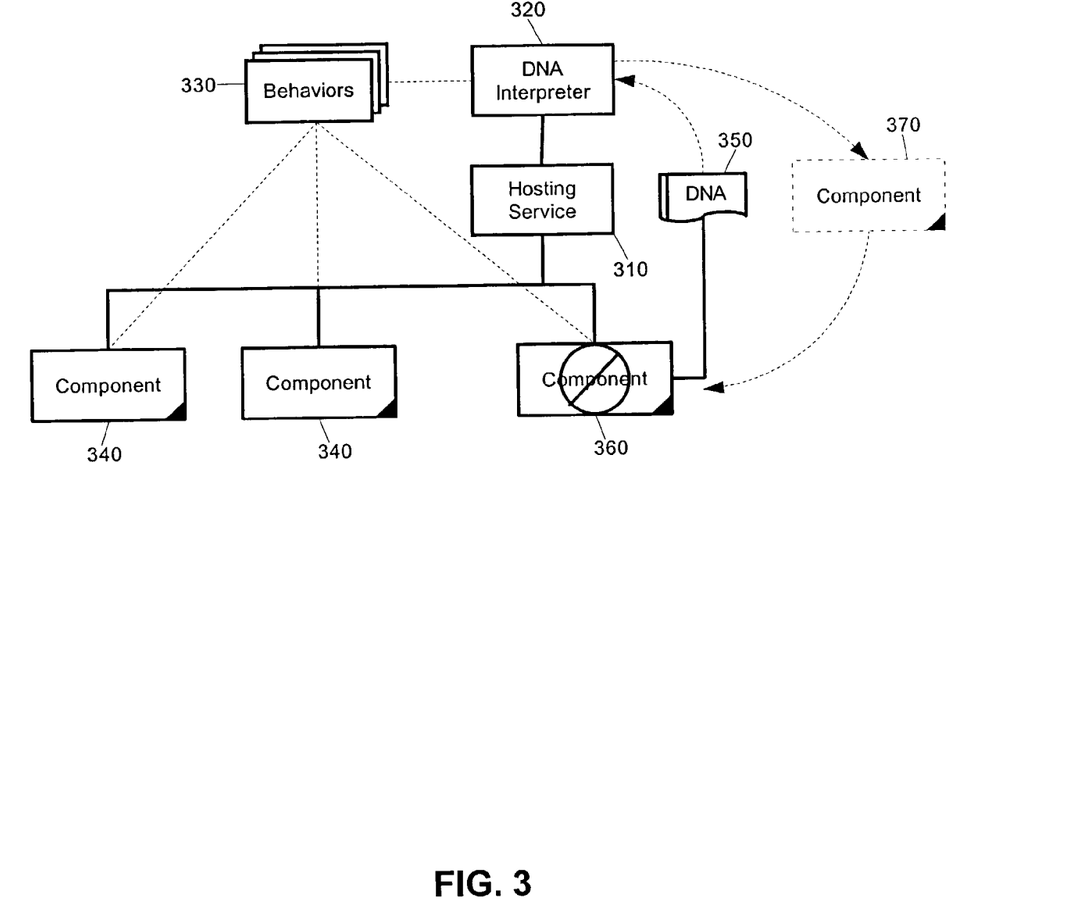
FIG. 3 is a block diagram illustrating the configuration of a hosting service to interoperate with the grid services DNA of the present invention; and, FIG. 4 is a flow chart illustrating a process for autonomically deploying a hosting service environment in the grid architecture of the present invention.

FIG. 3 is a block diagram illustrating the configuration of a hosting service to interoperate with the grid services DNA of the present invention. Referring now to the hosting service 310, during the bootstrap process a grid services DNA interpreter 320 can be used to link the created hosting service 310 with its corresponding behavior 330. This linkage can be performed synchronously for every hosting service component 340. Once the linkage has been completed, the grid services DNA interpreter 320 can sign-off from the bootstrap process by sending an updated copy of the grid services DNA 350 to the components 340 of the hosting service 310 as confirmation to the components 340 that the hosting service 310 is properly executing and available for access.

When activated, the grid service DNA interpreter 320 upon detecting a failure in a particular component 360 of the hosting service 310 can interpret the grid services DNA 350 associated with the failed component 360 of the hosting service 310 to re-create an instance 370 of the failed component 360. Moreover, the grid service DNA interpreter 320 can ensure that the re-created hosting service component 370 exhibits a requisite level of operation, that the components 340 of the hosting service 310 possess a copy of the grid services DNA 350, and that communication links have been established between all requisite components 340.

As a more specific example, in operation, when a component in the grid detects a failure in a peer, the component can attempt to re-deploy the failed peer in another host. Specifically, when a component detects a failure in a peer, the component can provide and alert to other functioning peers of the detected failure, in addition to a timestamp, and an indication of an intent to re-deploy the failed peer to a different host. Upon receiving acknowledgments to the alert from the other functioning peers, the component can redeploy the failed peer to another host.

It will be recognized by the skilled artisan that multiple components in the grid can detect the failure in the peer. In consequence, a two-phase commit approach can be used to prevent multiple components from re-deploying the same failed peer to a different host. For instance, where multiple components have detected the failed peer, only the component which provided the earliest timestamp in the alert can re-deploy the failed peer. In this way, multiple components can be prevented from redeploying the same failed peer to a different host.

Figure 4:
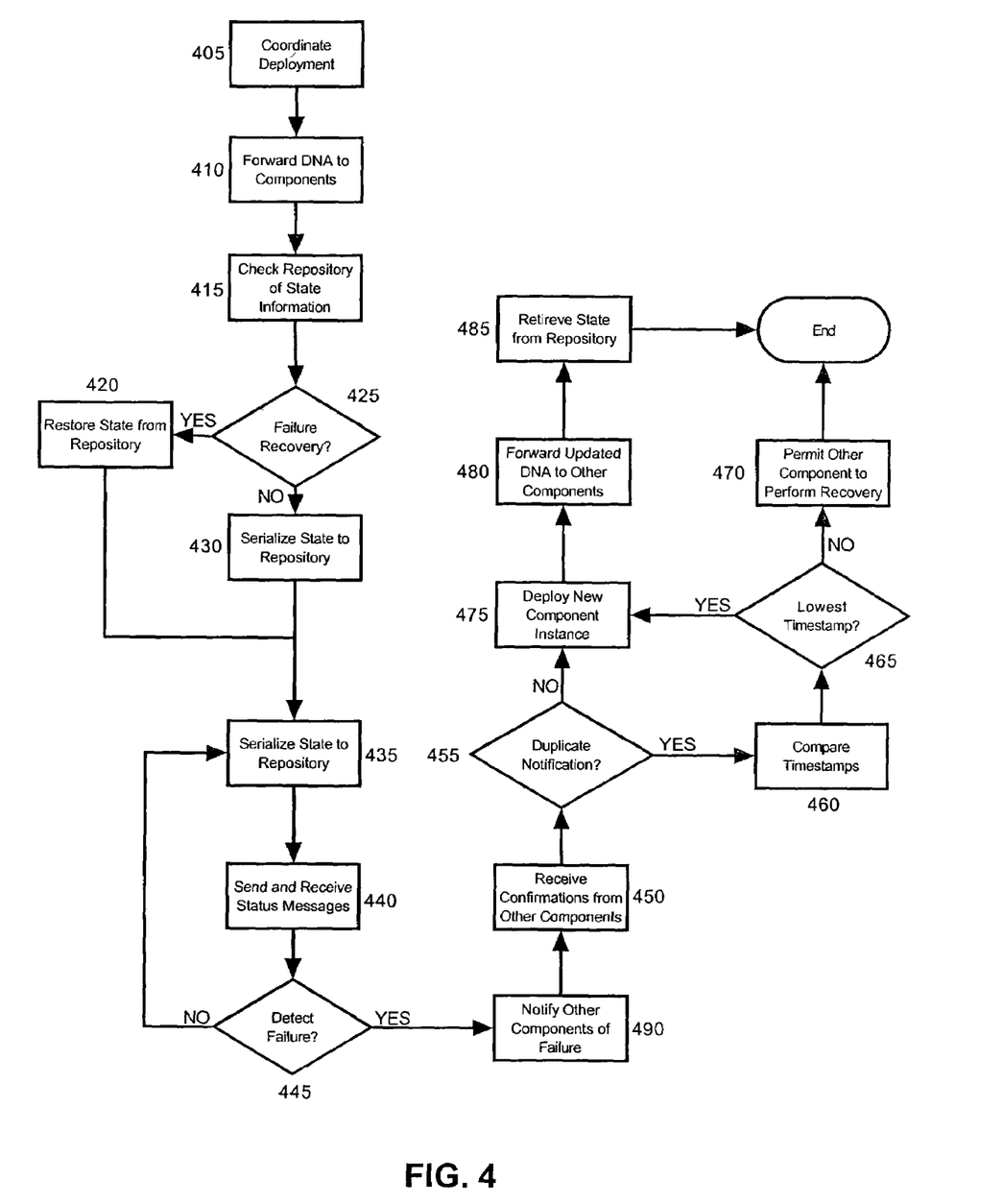

FIG. 4 is a flow chart illustrating a process for autonomically deploying a hosting service environment in the grid architecture of the present invention. Beginning in a bootstrap process of blocks 405 through 430, an administrator client can be started with information about which server or servers will host the components of the hosting service, as well as what behaviors will be combined to form the hosting service. A grid services DNA interpreter component in the server can coordinate the synchronous deployment of the components. The current grid services DNA can be forwarded to all components so that the components can begin normal operation. Finally, each component can check a repository of state information to ensure that the respective component has not experienced a failure. If a component has experienced a failure, its state can be restored using serialized state information stored in the repository. Otherwise, the state of the component can be serialized to the repository.

In a steady-state process illustrated in blocks 435 through 445, each component can serialize its state to the repository in a periodic manner. In particular, each respective component can serialize its state to a repository location specified in the grid service DNA associated with the respective component. From time to time, each component can send and receive status messages to others of the components in the hosting service. The availability, and conversely a failure, of the other components can be determined from the latency in responding to the status messages by the other components.

In block 490, if a failure is detected in a particular component, the particular component can notify the other components in the hosting service of the failure. Notably, the notification can include a timestamp. In block 450, the particular detecting component can receive confirmation from the notified components to proceed with a recovery operation. In block 455, if the component receives a duplicate failure notification from one or more other components, in block 460, the component can compare all timestamps to determine which component can handle the recovery operation. For example, in block 465, if the component does not have the lowest timestamp, in block 470 the component can permit another component to handle the recovery operation.

If, however, in block 465 the component does have the lowest timestamp, in block 475 the component can deploy a new instance of the failed component to another server in the grid. Also, the grid services DNA associated with the failed component can be updated to reflect the new instance of the failed component. In block 480, the updated grid services DNA can be forwarded to all peer components in the hosting service. Finally, in block 485 the redeployed component can retrieve its state from the repository specified by the grid services DNA.

Significantly, one skilled in the art will recognize that the self-healing and self-optimizing grid architecture provides a mechanism for detecting component failures, and even degraded component performance, within peer components in a hosting service. Once a failure has been detected, the detecting peer to undertake remedial action to recreate and redeploy the component in the hosting system. In particular, the detecting component can acquire the behavior of the failed component and the detecting component can instantiate an instance of the behavior in another server in the grid. Thus, the mechanism described herein can be analogized to biotechnical DNA as every component in the hosting service can maintain an awareness of the state of the entire system and can recreate the entire system through knowledge provided by the grid services DNA.

The present invention can be realized in hardware, software or firmware, in a centralized fashion in one computer system, or in a distributed fashion where different elements are spread across several interconnected computer systems. Any kind of computer system, or other apparatus adapted for carrying out the methods described herein, is suited to perform the functions described herein. A typical centralized implementation could include a general purpose computer system with a computer program that, when being loaded and executed, controls the computer system such that it carries out the methods described herein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of self-healing in a Web services grid comprising a plurality of hosting service components, said method comprising the steps of:
   detecting in at least one of the hosting service components a failure of a peer hosting service component;
   loading a grid services distributed network agreement (DNA), said grid services DNA specifying sufficient resource data necessary to redeploy any one failed hosting service component in the Web services grid; and,
   redeploying said failed peer hosting service component based upon an associated behavior specified in said grid services DNA, said redeploying step comprising
   alerting other peer hosting service components in the Web services grid of said detected failure;
   including with said alert a timestamp;
   receiving acknowledgments of said alert from said other peer hosting service components;
   computing a lowest timestamp among any timestamps included in said acknowledgments; and,
   if said time stamp included with said alert is computed to be said lowest timestamp, performing said redeploying step, but if said time stamp included with said alert is computed not to be said lowest timestamp, suppressing said redeploying step.

2. The method of claim 1, wherein said redeploying step comprises the steps of:
   deploying said failed peer component in a new physical location other than the physical location in which said failed peer component failed, said deployed failed peer component retrieving its prior state from said grid services DNA;
   updating said grid services DNA to specify said new physical location; and, forwarding said updated grid services DNA to others of said hosting service components.

3. A method of self-healing in a Web services grid comprising a plurality of hosting service components, comprising the steps of:
   detecting in at least one of the hosting service components a failure of a peer hosting service component;
   loading a grid services distributed network agreement (DNA), said grid services DNA specifying sufficient resource data necessary to redeploy any one failed hosting service component in the Web services grid;
   redeploying said failed peer hosting service component based upon an associated behavior specified in said grid services DNA; and,
   serializing state information for each of the hosting service components to fixed storage at a location specified by said grid services DNA.

4. A machine readable storage having stored thereon a computer program for self-healing in a Web services grid comprising a plurality of hosting service components, said computer program comprising a routine set of instructions which when executed cause the machine to perform, the steps of:
   detecting in at least one of the hosting service components a failure of a peer hosting service component;
   loading a grid services distributed network agreement (DNA), said grid services DNA specifying sufficient resource data necessary to redeploy any one failed hosting service component in the Web services grid; and,
   redeploying said failed peer hosting service component based upon an associated behavior specified in said grid services DNA, said redeploying step comprising
   alerting other peer hosting service components in the Web services grid of said detected failure;
   including with said alert a timestamp;
   receiving acknowledgments of said alert from said other peer hosting service components;
   computing a lowest timestamp among any timestamps included in said acknowledgments; and,
   if said time stamp included with said alert is computed to be said lowest timestamp, performing said redeploying step, but if said time stamp included with said alert is computed not to be said lowest timestamp, suppressing said redeploying step.

5. The machine readable storage of claim 4, wherein said redeploying step comprises the steps of:
   deploying said failed peer component in a new physical location other than the physical location in which said failed peer component failed, said deployed failed peer component retrieving its prior state from said grid services DNA;
   updating said grid services DNA to specify said new physical location; and,
   forwarding said updated grid services DNA to others of said hosting service components.

* * * * *